Sept. 29, 1925.
A. A. WYCKOFF
1,555,093
EXPANSIBLE ARMOR PLATE TIRE PROTECTOR
Filed June 17, 1924
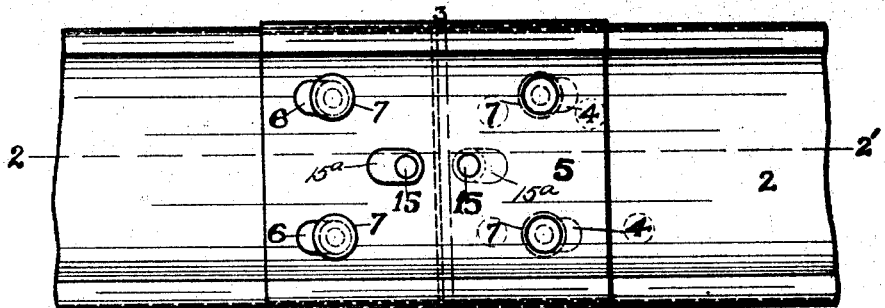
Fig. 1.
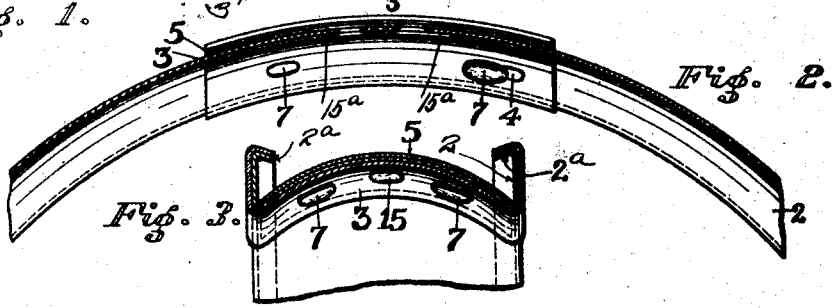
Fig. 2.
Fig. 3.
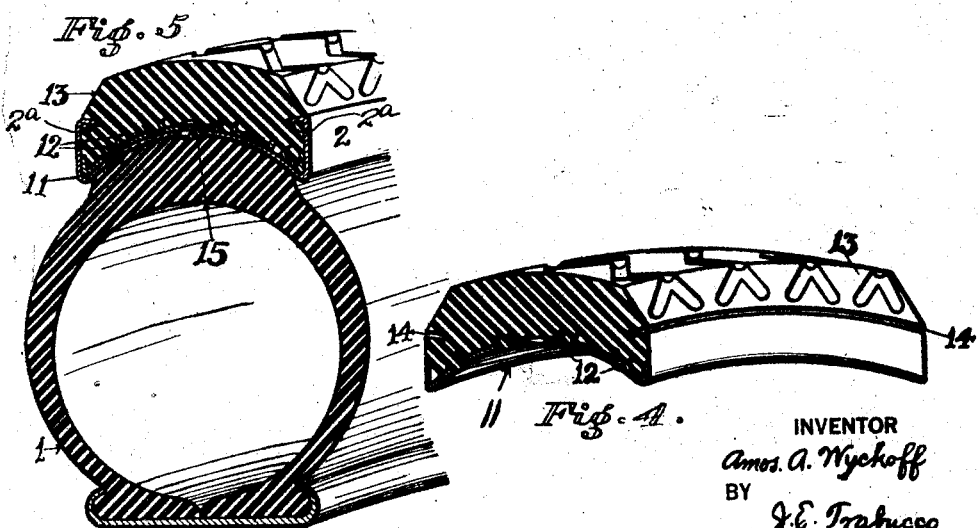
Fig. 5.
Fig. 4.
INVENTOR
Amos A. Wyckoff
BY
J. E. Trabucco
ATTORNEY Patented Sept. 29, 1925.

1,555,093

UNITED STATES PATENT OFFICE.

AMOS A. WYCKOFF, OF OAKLAND, CALIFORNIA.

EXPANSIBLE ARMOR-PLATE TIRE PROTECTOR.

Application filed June 17, 1924. Serial No. 720,554.

*To all whom it may concern:*

Be it known that I, AMOS A. WYCKOFF, a citizen of the United States, and resident of Oakland, Alameda County, State of California, have invented new and useful Improvements in Expansible Armor-Plate Tire Protectors, of which the following is a specification.

This invention relates to protectors for pneumatic tires of the type adapted to shroud the outer surface of the tire and thereby protect it from being punctured or damaged.

An object of this invention is to provide an expansible protector for a vehicle tire which is adapted to fit over the outer surface of the same.

Another object of this invention is to provide an overtire having a metallic layer formed therein which will prevent puncture or wear of the tire.

Another object of this invention is to provide an expansible overtire the ends of which are removably joined together in such a manner that the same may be supplied with new rubber when desired.

Heretofore the overtires used as protectors for pneumatic tires, have been made in one section with no provision being made for the removal of the outer rubber, nor for a convenient means for joining the ends together. I have found that by loosely joining the ends together so that the metallic section of the overtire is not rigid, the continual jar of the automobile will not damage the same nor cause it to break. Likewise I have found that by having the outer rubber section removable, the worn parts can be conveniently removed and a new tread substituted, thereby providing an overtire which will last indefinitely and satisfactorily protect the pneumatic tire from wear or puncture.

In the drawings accompanying this specification I have illustrated the constructions embodying the present invention.

In the said drawings:

Fig. 1 is a plan view of the metallic portion of the tire protector showing the means for joining the ends thereof together;

Fig. 2 is a sectional view taken on the line 2—2' of Fig. 1;

Fig. 3 is a cross sectional view taken on the line 3—3' of Fig. 1;

Fig. 4 is a perspective view of a part of the removable rubber which is placed on the metallic protector; and Fig. 5 is a perspective view of a part of a pneumatic tire with the tire protector applied to the same.

Referring to the drawing, the tread of a pneumatic tire 1, is encircled and encased by an arc shaped metallic band 2, having its edges turned up and provided with inwardly projecting flanged portions $2^a$, the ends of which band may be held together by the means shown. As shown in Figs. 1, 2 and 3, an arc shaped metal plate 3, having therein slots 4 and suitable rivet holes for accommodating the body portion of rivets, is placed under and across the joined ends of 2, while an arc shaped plate 5, having therein slots 6 and suitable rivet holes, is placed over and across the joined ends in such a manner that rivets 7, may be passed through the suitable holes in the said plates, similar holes in the ends of 2, and through each of the plates 3 and 5. The plate 3 is of the same shape as band 2, and large enough to fit around the outside thereof, while plate 5 is arc shaped and suitable in size to fit between the turned up edges of band 2. The ends of the rivets 7 are secured to the plates 3 and 5 while the body portions thereof are permitted to extend loosely through the slots 4 and 6 and the holes in said plates and band 2. Thus one pair of rivets extend through slots 4 in plate 3, and band 2 and are secured to the inner surface of plate 5 in the usual manner, while the other pair of screws or rivets extend through slots 6 in plate 5 and band 2 and are secured to plate 3. The said slots in the plates being disposed at opposite sides of the joined ends of band 2, permit the band to expand or contract, thereby preventing a fracture thereof. Another metallic band 11, suitable in size to fit inside band 2 is provided with a plurality of holes 12 distributed along its central portion, and to this is attached by vulcanizing or other means, a resilient rubber band 13. As the rubber is applied to the metallic band 11, a portion thereof passes into holes 12, thereby securely holding the same to metallic band 11. In applying the rubber to the band 11, encircling indentations 14 are provided in the rubber so as to permit the flanged portion $2^a$ of band 2 to fit within the same, and the portion of the said band 11 is left exposed which has therein the rivet holes through which rivets 15 pass. The metallic band 11 together with the rubber band 13 are inserted in one end of the band 2 and are forced around until the ends thereof are approximately together. After this is done rivets 15, which extend through slots 15$^a$ in the ends of band 2, are secured to the inside of metallic band 11, thereby holding 11 and 13 securely to 2. Upon the completion of this operation, the rubber band is vulcanized so as to cover entirely the rivets 15, and make its outer surface even.

After the armor plate protector is placed upon the deflated pneumatic tire the latter is inflated in the usual manner until the tread thereof presses firmly against the inside surface of the metallic band 2. The resilient rubber band 13, tends at all times to hold the ends of band 2 approximately together, and even though they are separated a slight degree upon the jarring of the pneumatic tire, the rubber band 13 pulls them into their proper position and tends to hold them there. Thus the rubber band serves the purpose of providing a suitable tread for the rotation of the automobile wheel, and at the same time holds the metallic bands of the tire protector in their proper position.

If at any time the rubber band 13, wears or is damaged to the extent of necessitating the substitution of a new rubber band, the rivets 15 may be removed, thereby permitting the removal of the metallic band 11 from the band 2. A new rubber band may then be substituted for the old one as heretofore explained, and placed in its proper position upon the device.

What I claim is:

1. A tire protector comprising a metallic encircling band adapted to encase the tread of a tire, a removable metallic band adapted to encircle said first mentioned band, a resilient material attached to said last mentioned band, and means for attaching the ends of said bands together.

2. A tire protector comprising a metallic band adapted to encase the tread of a tire, means for loosely holding the ends of said band together, a metallic band extending around said first mentioned band and provided with numerous holes, and a layer of resilient substance extending around and over said last named band.

3. A tire protector comprising a metallic band adapted to encase the tread of a tire, a pair of slotted plates adapted to hold the ends of the band together, a series of rivets extending loosely through the slots in the plates and adapted to hold the said plates and the ends of said band together, another metallic band encircling said first mentioned band, means for securing the two bands together and a resilient substance extending around said last mentioned band.

4. A tire protector comprising an arc shaped metallic band having the ends thereof provided with rivet holes and adapted to encase the tread of a tire, a pair of metallic plates provided with slots and adapted to be attached to the ends of the band by rivets, a series of rivets extending through said slots and the band, a removable metallic band extending around the outside of the first mentioned band, means for securing the two bands together, and a resilient substance attached to the outside of said last named band.

5. A tire protector comprising an arc shaped metallic band having the ends thereof held together by a pair of connecting plates loosely attached to each of the ends, a removable metallic band having numerous holes therein and adapted to encircle said first mentioned band, means for securing said bands together, and a layer of resilient substance attached to said last mentioned band and encircling the same.

AMOS A. WYCKOFF.